United States Patent
Baldwin et al.

(10) Patent No.: US 9,196,008 B2
(45) Date of Patent: Nov. 24, 2015

(54) GENERATING GUEST SUGGESTIONS FOR EVENTS IN A SOCIAL NETWORKING SYSTEM

(75) Inventors: Robert Michael Baldwin, San Francisco, CA (US); Henry Bridge, San Francisco, CA (US); Matthew Bush, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 76 days.

(21) Appl. No.: 13/584,625

(22) Filed: Aug. 13, 2012

(65) Prior Publication Data

US 2014/0047023 A1 Feb. 13, 2014

(51) Int. Cl.
*G06Q 50/00* (2012.01)
*G06Q 10/10* (2012.01)

(52) U.S. Cl.
CPC ............... *G06Q 50/01* (2013.01); *G06Q 10/10* (2013.01)

(58) Field of Classification Search
CPC ........ H04L 65/403; H04L 41/04; H04L 51/32
USPC ......... 709/203, 204, 205, 206, 217, 207, 223, 709/224, 225
See application file for complete search history.

(56) References Cited

U.S. PATENT DOCUMENTS

| 7,827,208 | B2 | 11/2010 | Bosworth et al. | |
|---|---|---|---|---|
| 8,108,414 | B2 | 1/2012 | Stackpole | |
| 8,171,128 | B2 | 5/2012 | Zuckerberg et al. | |
| 8,688,980 | B2 | 4/2014 | Davis et al. | |
| 2006/0143214 | A1 | 6/2006 | Teicher | |
| 2008/0071775 | A1* | 3/2008 | Gross ............................... | 707/5 |
| 2010/0063993 | A1 | 3/2010 | Higgins et al. | |
| 2010/0076850 | A1 | 3/2010 | Parekh et al. | |
| 2010/0082360 | A1 | 4/2010 | Chien et al. | |
| 2010/0106573 | A1* | 4/2010 | Gallagher ............... G06Q 30/02 | 705/14.4 |
| 2010/0203876 | A1 | 8/2010 | Krishnaswamy | |
| 2010/0274815 | A1* | 10/2010 | Vanasco ............ G06F 17/30867 | 707/798 |
| 2010/0331146 | A1 | 12/2010 | Kil | |
| 2011/0022602 | A1 | 1/2011 | Luo et al. | |
| 2012/0084160 | A1 | 4/2012 | Badros et al. | |
| 2012/0110071 | A1 | 5/2012 | Zhou et al. | |
| 2012/0166532 | A1 | 6/2012 | Juan et al. | |
| 2012/0278262 | A1* | 11/2012 | Morgenstern et al. .......... | 706/12 |
| 2012/0278317 | A1* | 11/2012 | Spiegel .................. G06Q 30/02 | 707/731 |
| 2013/0080524 | A1* | 3/2013 | Rubinstein et al. .......... | 709/204 |

(Continued)

OTHER PUBLICATIONS

Mislove, A. et al., "You Are Who You Know: Inferring User Profiles in Online Social Networks," *Proceedings of the Conference on Web Search and Data Mining '10*, Feb. 4-6, 2010, pp. 251-260, New York, New York, USA.

(Continued)

*Primary Examiner* — Barbara Burgess
(74) *Attorney, Agent, or Firm* — Fenwick & West LLP

(57) ABSTRACT

Social networking system users may create events where a group of other users invited to the event meet at a specified time and location. The social networking system suggests users to invite to an event based on a prediction that the users would attend the event if invited. Various factors may be used to make the prediction, such as an affinity between the inviting user and the other users, the availability of the other users at the time of the event and/or the proximity of the other users to the location of the event. An inviting user receives the suggested users and selects suggested users to invite to the event or invitations may be automatically sent to the suggested users by the social networking system.

18 Claims, 3 Drawing Sheets

(56) References Cited

U.S. PATENT DOCUMENTS

| | | | |
|---|---|---|---|
| 2013/0132194 A1* | 5/2013 | Rajaram | G06Q 50/01 705/14.52 |
| 2013/0137464 A1 | 5/2013 | Kramer et al. | |
| 2013/0159220 A1* | 6/2013 | Winn | G06N 3/08 706/12 |
| 2013/0268973 A1* | 10/2013 | Archibong et al. | 725/51 |
| 2013/0304685 A1* | 11/2013 | Kurata | G01C 21/20 706/45 |
| 2013/0317874 A1* | 11/2013 | Kozloski | G06Q 10/109 705/7.19 |
| 2014/0012925 A1* | 1/2014 | Narayanan | G06Q 10/109 709/206 |

OTHER PUBLICATIONS

U.S. Appl. No. 13/167,701, filed Jun. 24, 2011.
U.S. Appl. No. 13/429,126, filed Mar. 23, 2012.
U.S. Appl. No. 13/569,989, filed Aug. 8, 2012.
U.S. Appl. No. 13/627,774, filed Sep. 26, 2012.

* cited by examiner

300

```
┌─────────────────────────────────────────┐
│ Access user object associated with      │
│ inviting user                           │
│ 305                                     │
└─────────────────────────────────────────┘
                    │
                    ▼
┌─────────────────────────────────────────┐
│ Select event associated with inviting   │
│ user                                    │
│ 310                                     │
└─────────────────────────────────────────┘
                    │
                    ▼
┌─────────────────────────────────────────┐
│ Identify additional users connected to  │
│ inviting user                           │
│ 315                                     │
└─────────────────────────────────────────┘
                    │
                    ▼
┌─────────────────────────────────────────┐
│ Select candidate users from additional  │
│ users connected to inviting user        │
│ 320                                     │
└─────────────────────────────────────────┘
                    │
                    ▼
┌─────────────────────────────────────────┐
│ Select set of candidate users based on  │
│ scores                                  │
│ 325                                     │
└─────────────────────────────────────────┘
                    │
                    ▼
┌─────────────────────────────────────────┐
│ Identify set of selected candidate      │
│ users to inviting user                  │
│ 330                                     │
└─────────────────────────────────────────┘
```

FIG. 3

«GENERATING GUEST SUGGESTIONS FOR EVENTS IN A SOCIAL NETWORKING SYSTEM»

BACKGROUND

This disclosure relates to social networking, and more specifically, to systems for generating suggestions for guests to events in a social networking system based on social information.

Social networking systems allow users to create accounts that are tied to their identities. Users of a social networking system may create user profiles that store information that they choose to share with the system. A user's profile may include, for example, information about a user's age, gender, employer, alma mater, and marital status. Social networking systems also allow users to specify connections to other users of the system. The users that are connected to a specific user are called the "connections" or "friends" of a user.

Social networking systems also allow users to create events and to invite their connections, or the general public, to these events. However, social networking system users may have a large number of connections, making it difficult for a user creating an event to comprehensively select connections to invite to an event. For example, a user may have hundreds of connections, making it cumbersome for the user to identify connections to invite to a created event. Additionally, a user organizing an event may be unaware that some of their connections may have an interest in a specific event.

SUMMARY

A social networking system allows its users to facilitate personal interaction by creating events that specify a location, time, activity, and/or one or more people associated with the event. For example, when creating an event, a user may invite other users to a particular location at a particular time. To aid an inviting user in inviting additional users to an event, the social networking system may suggest users for inviting to the event. The social networking system may determine the suggested users based on the likelihood that the suggested users will accept an invitation to an event and/or the likelihood that the inviting user will act on the suggestion and invite the suggested users. In making this determination, the social networking system may use a variety of factors, such as the location and availability of the suggested users in view of the time and location identified by the event. The social networking system may also use other factors, such as the affinity between the inviting user and the suggested users, the frequency that the suggested users join events, the history of the suggested users attending events that the inviting user also attended, or other suitable factors in making the determination.

In one embodiment, the social networking system accesses information about the inviting user and identifies one or more events associated with the inviting user based on the information about the inviting user. An event associated with the inviting user is selected and information about the selected event is retrieved. The social networking system accesses user profiles, or other information, of one or more users that are connected to the inviting user and identifies a set of candidate users. In one embodiment, the location and time from the information about the event are compared to the user profiles of the users connected to the inviting user as a mechanism to select the set of candidate users. For example, the set may include users within a predetermined distance of the event location identified by the invitation and at the identified time.

As another example, the set includes users available at the time identified by the invitation and at a location within a predetermined distance of the location identified by the invitation.

One or more users may be selected from the set of candidate users based on a prediction of whether a suggestion to invite a candidate user would lead to the invited candidate user joining the event. In one embodiment, the affinity between the inviting user and a candidate user is used to predict whether a candidate user joins the event. A high affinity between the inviting user and a candidate user in the set indicates that the candidate user is likely to attend an event involving the inviting user. Other factors may be used in predicting whether a candidate user would join the event. For example, the location and/or availability of the candidate user at the time the event is scheduled to occur, and a history of a candidate user and the inviting user attending the same events provides an indication of whether the user is likely to accept the invitation to the event. Alternatively, the location and availability of social networking system users connected to the inviting user is used as a filter to identify the set of candidate users before the predictions are made. The inviting user is then notified of the selected one or more candidate users, allowing the inviting user to invite the selected one or more candidate users to the event. Alternatively, the social networking system sends invitations to the selected one or more candidate users.

BRIEF DESCRIPTION OF THE DRAWINGS

FIG. 3 is a flowchart illustrating a process for generating suggestions for guests to an event created in a social networking system in accordance with an embodiment of the invention.

Figure 1:
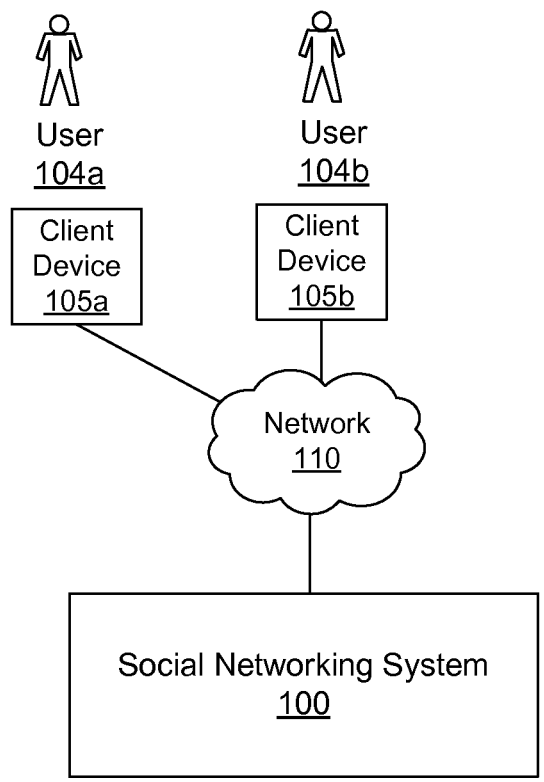
FIG. 1 is a high level block diagram of a system environment in which a social networking system operates in accordance with an embodiment of the invention.

The Figures depict various embodiments of the present invention for purposes of illustration only. One skilled in the art will readily recognize from the following discussion that alternative embodiments of the structures and methods illustrated herein may be employed without departing from the principles of the invention described herein. A letter after a reference numeral, such as "105a," indicates that the text refers specifically to the element having that particular reference numeral, while a reference numeral in the text without a following letter, such as "105," refers to any or all of the elements in the figures bearing that reference numeral.

DETAILED DESCRIPTION

A social networking system offers its users the ability to communicate and interact with other users of the social networking system. Users join the social networking system and add connections to a number of other users to whom they desire to be connected. Users of the social networking system may provide personal information to the social networking system, which is stored in user profiles. For example, a user may provide age, gender, geographical location, education history, employment history and the like. The data provided by a user may be used by the social networking system, along with other data, to generate useful suggestions for presentation to the user. For example, the social networking system uses the provided data along with other social networking system information to suggest additional users for a user to invite to an event. The user may be any user authorized to invite other users to the event, such as an event creator or an event host, a promoter or a user invited to the event with the authority to invite additional users. In various embodiments, the social networking system suggests guests based on a prediction of the likelihood that an inviting user will invite a suggested user to the event and/or a prediction of the likelihood that a suggested user would attend the event if invited. Additional factors may be used when suggesting users to invite to an event, as further described below.

FIG. 1 is a high level block diagram illustrating an embodiment of a system environment for generating suggestions of additional users for social networking system users 104 (also referred to as "users") to invite to an event based on social networking system data. The users 104a and 104b interact with the social networking system 100 using client devices 105a and 105b, which communicate with a social networking system 100 via a network 110.

The client devices 105 comprise one or more computing devices capable of receiving input from the users 104 and transmitting and/or receiving data via the network 110. In one embodiment, a client device 105 is a conventional computer system executing, for example, a Microsoft WINDOWS®—compatible operating system (OS), Apple OS X®, and/or a Linux distribution. In another embodiment, a client device 105 is a device having computer functionality, such as a personal digital assistant (PDA), mobile telephone, smart-phone, etc.

A client device 105 may execute an application, for example, a browser application that allows a user 104 of the client device 105 to view information from and provide information to the social networking system 100. In some implementations the client device 105 executes a mobile application (such as an IOS® app or an ANDROID™ app) that allows a user 104 to interact with the social networking system 100. In one implementation client devices 105 receive informative "suggestions" for the users 104 from the social networking system 100, which the users 104 can confirm or deny using a user interface on the client devices 105. For example a user may receive a suggestion from the social networking system 100 identifying suggested users for the user to invite to an event; the user may use an interface on the client device 105 to confirm or reject the suggested users, and the social networking system 100 may send invitations to the event to suggested users confirmed by the user.

The network 110 enables communications between one or more client devices 105 and the social networking system 100. In one embodiment, the network 110 uses standard communications technologies and/or protocols. Thus, the network 110 may include communication channels using technologies such as Ethernet, 802.11, worldwide interoperability for microwave access (WiMAX), 3G, digital subscriber line (DSL), etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. Data exchanged over the network 110 may be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

Figure 2:
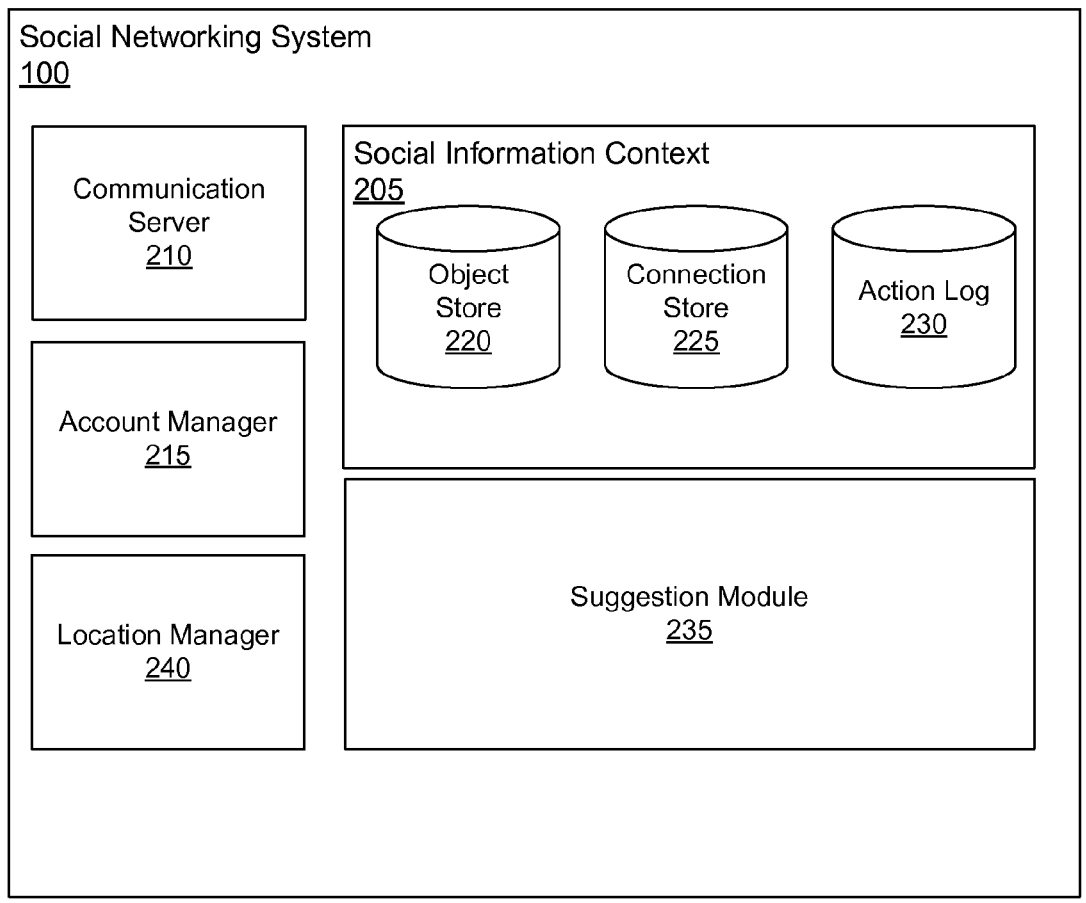
FIG. 2 is a high level block diagram of the components of a social networking system in accordance with an embodiment of the invention.

The social networking system 100 stores information related to users and other entities and provides this information to the users 104 through their client devices 105. FIG. 2 illustrates a more detailed view of the components of one embodiment of the social networking system 100. In the embodiment shown by FIG. 2, the social networking system 100 includes a communication server 210, an account manager 215, a social context store 205, a suggestion module 235, and a location manager 240. Different implementations of the social networking system 100 may use different modules in different combinations and may include other modules.

The communication server 210 links the social networking system 100 via the network 110 to one or more of the client devices 105. Additionally, the communication server 210 provides information from the social networking system 100 to the client devices 105 for presentation to the users 104. The communication server 210 also receives information from the client devices 105 and provides it to components of the social networking system 100.

The account manager 215 authenticates users communicating with the social networking system 100 using the client devices 105. For example, a user 104 provides a user name and password through a client device 105 to the communication server 210. The user name and password are communicated to the account manager 215, which verifies that the user name and password correspond to an account maintained by the social networking system 100.

In one embodiment, the communication server 210 acts as a web server and serves web pages, as well as other web-related content, such as JAVA®, FLASH®, XML, and so forth to the client devices 105 via the network 110. The communication server 210 may also act as an application server and serves application specific data to the client devices 105, such as application-specific JAVASCRIPT® Object Notation (JSON), etc. In some embodiments, the communication server 210 receives standard communication such as e-mails, short message service (SMS) messages, text messages, voice calls, etc., and routes these communications between users of the social networking system 100. The routed communication may be processed and stored by the social networking system 100 in the social context store 250 to provide additional information about social networking system users. The social networking system 100 may include other components to assist in communications such as network interfaces, security mechanisms, load balancers, failover servers, management and network operations consoles, and the like. These are not shown explicitly in FIG. 2.

The social context store 205 stores data related to entities—including users—in the social networking system 100 and the connections between these entities. The social context store 205 includes an object store 220, connection store 225, and an action log 230. However, the social context store 205 may also include other information collected from external feeds, third-party databases, etc. Data from the social context store 205 is used by the suggestion module 235, further described below, to identify suggestions for users to invite to an event.

The users and other entities whose information is stored by the social networking system may be represented in the social networking system 100 as objects, which are stored in the object store 220. There may be distinct object types for the different types of entities whose information is stored by the social networking system 100 (e.g. user objects, restaurant objects, event objects, etc.). For example, when a user 104 creates an account on the social networking system 100, a user object may be generated and associated with that user. Similarly, there may be band objects for bands, company or brand objects for corporations, film objects for movies, etc.

Each of these object types may store information pertinent to the particular entity being represented. For example, user objects may include gender, age, birthday, etc., while band objects may include album information, song information, tour dates, etc.

The social networking system 100 allows different entities to create events identifying a time and location for a group of invited users to meet. Events are represented by event objects included in the object store 210. Event objects can be associated with other objects such as user objects, band objects, brand objects, etc. A user creating an event (also referred to as an "event organizer") is able to modify the created event and is referred to herein as an event organizer. For example, the user creating an event may invite additional users to the event, delete the event object corresponding to the event or modify data associated with the event object. Additionally, an event organizer may enable other users to invite additional users to the event. User objects associated with the user creating an event, with users invited to the event and with users authorized to invite other users to the event are connected to the event object associated with the event.

Different types of events may be created, with different types of event objects used to represent the different types of events and store information associated with the different types of events. Data included in the event object identifies an event type. Examples of event types include birthdays, product launches, baby showers, parties, concerts, graduations, weddings, etc.

Information received by the communication server 210 may be associated with specific objects in the object store 220 based on the account verification performed by the account manager 215. For example, the account manger 215 authenticates a user 104 that logs into the social networking system 100 and associates the user's activity with the user's user object. If the user subsequently creates an event using the social networking system 100, an event object describing the event is stored in the object store 220 and associated with the user's user object.

The social networking system 100 also tracks connections between the stored objects and stores the connections between objects as connection data in the connection store 225. The connection data (or "connections") represents relationships between objects in the object store 220. For example, if a user indicates that they are a fan of a particular band, a connection is created linking that user's object and the band's object. The connection in this example may have a connection type indicating that the user is "a fan of" the band. The connection store 225 may store a number of different connection types to track a wide variety of relationships between objects in the object store 220.

In one embodiment, the connection store 225 includes connections having different connection types indicating relationships between users and events. For example, different connection types indicate that users are organizers or attendees of an event. These connection types allow the social networking system 100 to efficiently identify users attending an event by identifying users connected to an event object by a specified connection type. Similarly, the organizers for an event can be determined by the social networking system 100 by identifying user objects connected to an event object having a connection type indicating an event organizer.

As a specific example, users 104 John and Joe are represented as two user objects in the object store 220; John creates an event in the social networking system 100 for his birthday party and may send Joe an invitation to the birthday party. When John creates the event an event object having an event type of "birthday" is generated and stored in the object store 220, while a connection between John's user object and the event object is created that has a connection type indicating that John is the event organizer. Additionally, the event object may also include data indicating John is the event organizer. When Joe indicates that he will attend the birthday event a connection is generated between Joe's event object and the event object, with the connection having a connection type indicating Joe is an "attendee of" the event. Hence, the connection types allow the social networking system to readily identify different relationships between users and events.

The social networking system 100 may also store information related to the actions of users and other entities. When the social networking system 100 receives information that a user has taken a particular action, an action object is generated for that action. The action object indicates the type of action taken by the user and the objects related to that action. For example, if a user attends a particular event, action data may be generated indicating the user, the event, the time of attendance, the location, etc. The action objects may be logged in the action log 230. The action log 230 may also track the actions taken by users on the social networking system 100, for example sending messages to other users, posting photos, posting comments, etc.

The objects, connections, and actions stored in the social context store 205 may be viewed as a graph, where the objects are nodes and the connections and actions are edges connecting the nodes. This graph is sometimes called a social graph. The social graph may be traversed to discover the relationship between objects stored in the social networking system 100. For example, to determine the restaurants visited by a specific social networking system user 104, a node corresponding to the user's user object is identified in the social graph and restaurant objects connected to the user object through edges (actions or connections) indicating that the user has "checked in," "reviewed," "dined at," etc. are identified. Similarly, to determine restaurants visited by the user's friends, additional user objects connected to the user object by edges (connections) indicating a friend relationship are identified; restaurant objects connected to these additional user objects by certain types of edges are identified. Hence, the social graph may be used to determine the various relationships between different objects maintained by the social networking system 100.

The social networking system 100 may also associate geographical location information with actions, connections, and objects. For example, the communication server 210 receives information from client devices 105 that can be used to determine the locations associated with data in the social networking system 100. The information from the client devices 105 is processed by the location manager 240 and associated with objects, connections, or actions in the social context store 205. For example, if a user creates an event in the social networking system 100 and specifies a location for the event (e.g., an address), this location may be stored with an event object associated with the event.

Locations may also be determined without being directly specified by a user. For example, some client devices 105 have GPS capabilities that may allow the location manager 240 to obtain location information directly from the client devices 105. The location of a client device 105 can be associated with actions performed by a user 104 associated with the client device 105. For example, if a user uploads a picture from a client device 105 that is stored as an object in the social context store 205, the location manager 240 retrieves a location from the client device 105 and associates the location with the object. Similarly, the location of a client device 105 may be used to infer the location of a user 104 associated with that client device 105. The client device location may be associated with a user object in the object store 220 associated with the user 104, and as the location of the client device 105 changes, the location associated with the user object may also be changed. In some implementations, the location associated with the client device 105 may not be received directly as GPS coordinates, but may be inferred by the location manager 240 using other information received by the communication server 210. For example, if a user "checks in" to a location, such as a restaurant, the user's location may be approximated to be the location of the restaurant. Additionally, the location manager 240 may approximate a user's location at a time from the locations or one or more events having a similar time to which a user has accepted an invitation.

The suggestion module 235 generates suggested actions, objects or users (collectively referred to as "suggestions") for a user based on data in the social context store 205. The suggestions are the social networking system's recommendations of actions, objects or users that may be useful or interesting to the user. When the user takes a suggested action, the action may be recorded in the action log 230 and, if appropriate, new connections may be generated in the social networking system based on the action. Similarly, if the user performs an action on a suggested object or user, a connection between the user and the suggested object or user is stored in the connection store 225. For example, the suggestion module 235 determines that a user is an organizer of a birthday party event and presents the user with suggestions of additional users to invite to the birthday party event. If the user organizing the birthday party selects a suggested additional user, the selection is communicated to the social networking system 100, which sends an invitation to the birthday party event to the selected suggested additional guest. The social networking system also stores a connection between the selected suggested additional user, or other suggested users receiving an invitation, and the birthday party event.

In one embodiment, the suggestion module 235 accesses the object store 220, the connection store 225 and/or the action log 230 to identify a set of candidate users for inviting to an event by an inviting user, and sends a suggestion to the inviting user to invite one or more candidate users from the set. A variety of factors are used to select the set of candidate users, and the candidate users that are suggested as guests to the inviting user are the users that are predicted to most likely attend the event as a result of suggesting them as guests to the inviting user. The prediction may take into account both the likelihood of an inviting user sending an invitation based on a suggestion, and the likelihood of a candidate user accepting an invitation to the event.

A variety of factors may be used to select a set of candidate users. For example, the set of candidate users includes users connected to the inviting user, users connected to the inviting user within a specified distance of the event's location or users connected to the inviting user within a specified distance of the event's location and available at the time of the event. Hence, the suggestion module 235 may filter the users connected to the inviting user and not invited to the event based on their proximity to the event and/or their availability at the time of the event to select the set of candidate users. In other embodiments, the suggestion module 235 may use other attributes of the users connected to the inviting user and the event to select the set of candidate users. For example, the set of candidate users includes users that have likes, activities, status messages, or stated interests that correspond to a topic or category associated with the event. For instance, if the event is an automobile race, the candidate users include users that have indicated an interest in automobile racing, that have liked pages related to automobile racing, that have posted status messages related to automobile racing topics, or have participated in activities related to automobile racing in the past (e.g. attending automobile racing events). Determination of topics and categories from status message updates is further described in U.S. application Ser. No. 13/167,701, filed on Jun. 24, 2011, which is hereby incorporated by reference in its entirety.

The suggestion module 235 also uses affinity scores between the inviting user and candidate users to determine which candidate users to select. The affinity score represents the likely interest in a candidate user by the inviting user. In some embodiments, the affinity scores also account for characteristics of the event, as well as the inviting user and a candidate user. An affinity score between the event and a candidate user represents the likely interest in the event by a candidate user. A candidate user may be selected based on both an affinity score between the candidate user and the event and an affinity score between the candidate user and the inviting user. For instance, a weighted sum of the affinity score between a candidate user and the event, and the affinity score between a candidate user and the inviting user may be used to select a candidate user. The weighting of the affinity scores may be adjusted to emphasize the interest in a candidate user by the inviting user, or the interest in the event by a candidate user. Generation of an affinity score between objects in the social networking system 100 is further described in U.S. application Ser. No. 12/978,265, filed on Dec. 23, 2010, which is hereby incorporated by reference in its entirety.

In addition to affinity scores between the inviting user and the various candidate users, additional factors may be used by the suggestion module 235 to select candidate users. For example, the suggestion module 235 accesses the object store 220 and/or the location manager 240 to determine the geographic location of a candidate user and/or to determine the availability of a candidate user during the time of the event. To identify candidate users most likely to attend the event, the suggestion module 235 may account for the distance between a candidate user and the event's location in addition to affinity score, so candidate users within a threshold distance of the event's location are selected.

The likelihood of a candidate user attending an event may be determined based on various factors, such as the availability of candidate users at the time of the event, the proximity of candidate users to the event location, the affinity scores between candidate users and the inviting user as well as other suitable factors. The suggestion module 235 may use additional information from the object store 220, the connection store 225, and/or the location manager 240 in determining the likelihood that a candidate user will accept an invitation to an event. For example, the suggestion module 235 determines shared interests between the inviting user and a candidate user based on information in the user profiles for the respective users and/or actions taken by the users. The suggestion module 235 may determine that a candidate user with a number of types of interests in common with the inviting user is likely to attend an event that the inviting user created or is attending. For instance, the inviting user and a candidate user may both share a common stated interest in several films and TV shows, and based on this commonality the suggestion module 235 may determine that the likelihood of the candidate user accepting an invitation to a film event, from the inviting user, is high. As another example, the suggestion module 235 estimates a candidate user's likelihood of accepting an invitation to the event based on prior actions by a candidate user relating to events with similar attributes. For example, a candidate user that has joined events created by the inviting user, has joined events that the inviting user has also attended, has joined events at the same location as the event and/or has joined events with similar themes may be determined to have a higher likelihood of accepting an invitation to the event. For instance, a candidate user that has attended art exhibitions in the past may be determined to have a higher likelihood of accepting an invitation to an art gallery event.

In another embodiment, the suggestion module 235 determines the likelihood that the inviting user would send an invitation to a candidate user if the candidate user was suggested to the inviting user. This likelihood may also be based on the inviting user's affinity for the candidate user as well as other factors, as described above. Alternatively, the suggestion module 235 determines the likelihood that the inviting user would send an invitation to a candidate user if suggested and the likelihood that the candidate user would join the event upon receiving an invitation; for example, the suggestion module 235 identifies candidate users based on the product of the likelihood that the inviting user would send an invitation to the candidate user and the likelihood that the candidate user would accept the invitation.

Other data may be used by the suggestion engine 235 to determine the likelihood that candidate users would attend an event. Additional examples of data include a level of interaction between the inviting user and a candidate user, a number of users connected to both the inviting user and to a candidate user, a similarity of interests or other user profile information of the inviting user and the candidate user, a degree of separation between the inviting user and a candidate user or other information indicating an affinity between the inviting user and a candidate user. For instance, a candidate user that has frequently messaged the inviting user, and has many friends in common with the inviting user, may be determined to have a higher likelihood of attending the event.

In some embodiments, the suggestion module 235 associates a social value with each candidate user representing the social influence of each candidate user. This "social influence" may represent the likelihood that additional users will join an event that a candidate user joins. Hence, the social value allows identification of users whose attendance to an event increases the likelihood that additional users attend the event. For a candidate user, this value may be based on a number of factors including: the number of connections to other users or objects associated with the candidate user, the type of connections the candidate user has to other users or objects, a frequency that other users accept invitations from the candidate user, number of interactions between other users and the candidate user, as well as other factors. Using the social values associated with different candidate users, the suggestion module 235 determines an expected value for different candidate users based on their social value and the likelihood that they accept an invitation to the event. Candidate users having the highest expected values or having expected values equaling or exceeding a threshold value are suggested by the suggestion module 235 to the inviting user. Determination of social influence and social value for users in the social networking system 100 is further described in U.S. application Ser. No. 13/429,126, filed on Mar. 23, 2012, which is hereby incorporated by reference in its entirety.

Generating Event Suggestions

FIG. 3 illustrates a method 300 for suggesting social networking system users to invite to an event. In the example of FIG. 3, one or more suggested users are identified for presentation to an inviting user, which is a user associated with an event with the authority or capability to invite additional users. For example, an inviting user may be an event creator, an event host, a promoter, a sponsor or any other social networking user associated with an event and capable of inviting users to an event.

The suggestion module 235 accesses 305 a user object associated with the inviting user. The accessed user object describes attributes of the inviting user, such as interests, gender, age, current location, hometown, educational history, employment history or other data describing the inviting user. Using connections to the accessed object, the suggestion module 235 identifies additional users connected to the inviting user and one or more events connected to the inviting user. The suggestion module 235 identifies one or more event objects connected to the accessed event object and selects 310 an event allowing the inviting user to invite additional users. In one embodiment, the event is selected 310 based on the connection types of connections between event objects and the user object. Examples of connection types between an inviting user and an event include connection types associated with an event organizer, with an event host, with an event promoter or with a user specified as authorized to invite additional users.

An event object associated with the selected event is retrieved to identify information about the event such as date, time, type of event (concert, birthday party, speech, rally, graduation, etc.), organizers, inviters, existing invitees, etc. Based on data in the object store 205 and the connection store 210, the suggestion module 235 identifies 315 additional users connected to the inviting user. For example, user objects connected to the user object associated with the inviting user are identified 315 and retrieved. Based on data associated with the additional users connected to the inviting user, candidate users are selected 320.

The suggestion module 235 may use a variety of factors to select 320 the candidate users. For example, the candidate users include users connected to the inviting user, users connected to the inviting user and within a specified distance of the event's location or users connected to the inviting user within a specified distance of the event's location and available at the time of the event. Hence, the suggestion module 235 may filter the users connected to the inviting user based on their proximity to the event and/or their availability at the time of the event to select 320 the candidate users.

In other embodiments, the suggestion module 235 may use other attributes of the users connected to the inviting user and the event to select 320 the candidate users. For example, the affinity of the inviting user for different users connected to the inviting user may be used to select 320 the candidate users for which the inviting user has the highest affinity. As another example, responses of users connected to the inviting user, for invitations to events having similar attributes as the selected event may be used to select 320 the candidate users; for example, users connected to the inviting user and accepting more than a threshold number of invitations to prior events similar to the selected event are included in the set of candidate users. Affinities between the users connected to the inviting user and the selected event may also be used when selecting 320 the candidate users.

From the set of candidate users, the suggestion module 235 selects 325 a set including one or more candidate users based on a score calculated for each of the candidate users. In one embodiment, the score is based on a prediction that a candidate user would join the event if notified of it (i.e., the likelihood a candidate user would accept an invitation to the event). As described above in conjunction with FIG. 2, the suggestion module 235 may use a variety of factors to determine the likelihood that a candidate user would join an event, and in turn, to determine the score for the candidate user. For example, the suggestion module 235 bases the prediction of a candidate user joining the event on one or more of the candidate user's affinity score for the inviting user, the candidate user's location relative to the event's location and the candidate user's availability at the time of the event. The suggestion module 235 may select 325 candidate users having scores indicating at least a threshold probability, or likelihood, of attending the event if invited to the event.

In another embodiment, the score calculated by the suggestion module 235 is based on a prediction that the inviting user would send an invitation to a candidate user if suggested to send an invitation (i.e., the likelihood the inviting user would send an invitation to the event to a candidate user). This likelihood may also be based on the inviting user's affinity for the candidate user as well as other factors. Alternatively, the score may be based on both the likelihood that the inviting user would send an invitation to a candidate user if suggested and the likelihood that the candidate user would join the event upon receiving an invitation; for example, the score for a candidate user is the product of the likelihood that the inviting user would send an invitation to the candidate user and the likelihood that the candidate user would accept the invitation.

However, in various embodiments, the suggestion module 235 may base the score associated with a candidate user on different data. Additional examples of data include a level of interaction between the inviting user and a candidate user, a number of users connected to both the inviting user and to a candidate user, a similarity of interests or other user profile information of the inviting user and the candidate user, a degree of separation between the inviting user and a candidate user or other information indicating an affinity between the inviting user and a candidate user. As another example, the suggestion module 235 determines an expected value for the candidate users based on their social value and likelihood of attending the event, as described above in conjunction with FIG. 2, and bases the score for a candidate user on the candidate user's expected value.

The suggestion module 235 identifies 330 the one or more selected candidate users to the inviting user, allowing the inviting user to determine whether to invite one or more of the selected candidate users to the event. The selected candidates may be identified to the inviting user by sending a notification to a client device 105 associated with that user. For example, a text message, email, or application notification may be displayed to the inviting user on an electronic device that they are operating. The selected candidates may also be identified through stories in a newsfeed that are sent to a client device 105 associated with the inviting user. Systems and methods for generating social networking system stories for a newsfeed that may be displayed on a client device are disclosed in U.S. application Ser. No. 11/503,037, filed on Aug. 11, 2006, and U.S. application Ser. No. 11/502,757, filed on Aug. 11, 2006, which are hereby incorporated by reference in their entirety.

Responsive to the inviting user identifying 335 one or more of the selected candidate users to invite to the event, the social networking system 100 may send an invitation to the identified selected candidate users or otherwise notify the selected candidate users identified by the inviting user of the selected event. This allows the inviting user to control users receiving invitations to the event while considering the additional users suggested by the suggestion module 235. In an alternative embodiment, the social networking system 100 may automatically invite the selected candidate users; for example, the inviting user may store data in its corresponding user object authorizing the social networking system 100 to send invitations to an event to users suggested by the suggestion module 235.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
accessing information about an inviting user of a social networking system;
selecting an event associated with the inviting user by the social networking system;
retrieving information about the selected event;
accessing information about social networking system users connected to the inviting user;
selecting a set of candidate users from the social networking system users who are connected to the inviting user;
predicting, by a processor, for each of the candidate users, whether a suggestion to the inviting user to invite the candidate user to the event would be acted upon by the inviting user and would lead to the candidate user joining the event;
selecting one or more candidate users from the set based on the predicting; and
sending by the processor a suggestion to the inviting user to send an invitation for the event to the selected one or more candidate users.

2. The method of claim 1, wherein selecting the set of candidate users from the social networking system users connected to the inviting user comprises:
selecting users connected to the inviting user and associated with a location within a specified distance of a location included in the information about the event.

3. The method of claim 1, wherein selecting a set of candidate users from the social networking system users connected to the inviting user comprises:
selecting users having a location within a specified distance of a location included in the information about the event and an availability at a time included in the information about the event.

4. The method of claim 1, wherein the prediction of whether the suggestion to invite a candidate user would lead to the candidate user joining the event is based on an affinity for the candidate user by the inviting user.

5. The method of claim 1, wherein selecting one or more candidate users from the set based on the prediction comprises:
determining for each candidate user a likelihood that the candidate user would join the event based on an affinity for the inviting user by the candidate user and a history of the candidate user attending events that the inviting user attended; and
selecting one or more candidate users having highest likelihoods of joining the event.

6. The method of claim 1, wherein selecting one or more candidate users from the set based on the prediction comprises:
determining for each candidate user a likelihood that the candidate user would join the event based on an affinity for the inviting user by a candidate user and a history of the candidate user attending events that the inviting user attended; and
selecting one or more candidate users for whom the likelihood exceeds a threshold likelihood.

7. The method of claim 1, wherein selecting one or more candidate users from the set based on the prediction comprises:
determining for each candidate user a likelihood that the candidate user would join the event based on an affinity for the inviting user by a candidate user, a history of the candidate user attending events that the inviting user attended and the candidate user's location at the time included in the information about the event; and
selecting one or more candidate users for whom the likelihood exceeds a threshold likelihood.

8. The method of claim 7, wherein the candidate user's location at the time included in the information about the event is determined from one or more responses to additional events associated with a location identified by the invitation received from the candidate user.

9. The method of claim 1, wherein selecting one or more candidate users from the set based on the prediction comprises:
assigning a social value to each candidate user from the set;
determining a likelihood that each candidate user from the set will join the event;
determining an expected value for each candidate user from the set, the expected value of a candidate user based on the candidate user's social value and a likelihood that the candidate user will join the event;
selecting one or more candidate users having highest expected values.

10. The method of claim 1, further comprising:
receiving a response from the inviting user identifying a candidate user to receive an invitation, and sending a notification of the event to an electronic device associated with the identified user.

11. The method of claim 1, wherein sending the suggestion to the inviting user to send the invitation for the event to the selected one or more candidate users comprises:
including a story identifying the listing in a newsfeed sent to an electronic device associated with the inviting user.

12. The method of claim 1, wherein sending the suggestion to the inviting user to send the invitation for the event to the selected one or more candidate users comprises:
sending a notification identifying the selected one or more candidate users to an electronic device associated with the inviting user.

13. The method of claim 1, wherein the event associated with the inviting user is an event that the inviting user is hosting or an event that the inviting user created.

14. The method of claim 1, wherein the event associated with the inviting user is an event authorizing the inviting user to invite additional users.

15. A computer program embodied on a non-transitory computer readable memory having instructions for performing steps comprising:
accessing information about an inviting user of a social networking system;
selecting an event associated with the inviting user by the social networking system;
retrieving information about the selected event;
accessing information about social networking system users connected to the inviting user;
selecting a set of candidate users from the social networking system users who are connected to the inviting user;
predicting, by a processor, for each of the candidate users, whether a suggestion to the inviting user to invite the candidate user to the event would be acted upon by the inviting user and would lead to the candidate user joining the event;
selecting one or more candidate users from the set based on the predicting; and
sending by the processor a suggestion to the inviting user to send an invitation for the event to the selected one or more candidate users.

16. The computer program embodied on a non-transitory computer readable memory of claim 15, wherein selecting the set of candidate users from the social networking system users connected to the inviting user comprises:

selecting users connected to the inviting user and associated with a location within a specified distance of a location included in the information about the event.

17. The computer program embodied on a non-transitory computer readable memory of claim 15, wherein the prediction of whether the suggestion to invite a candidate user would lead to the candidate user joining the event is based on an affinity for the candidate user by the inviting user.

18. The computer program embodied on a non-transitory computer readable memory of claim 15, wherein selecting one or more candidate users from the set based on the prediction comprises:

determining for each candidate user a likelihood that the candidate user would join the event based on an affinity for the inviting user by a candidate user and a history of the candidate user attending events that the inviting user attended; and selecting one or more candidate users for whom the likelihood exceeds a threshold likelihood.

* * * * *